US010067370B2

United States Patent
Tsai et al.

(10) Patent No.: US 10,067,370 B2
(45) Date of Patent: Sep. 4, 2018

(54) POLYMERIC DISPERSED LIQUID CRYSTAL LIGHT SHUTTER DEVICE AND SYSTEM AND METHOD FOR FORMING THE SAME

(71) Applicant: Polytronix, Inc., Richardson, TX (US)

(72) Inventors: Menting Tim Tsai, Plano, TX (US); Casey S. Hunt, Sachse, TX (US); Robert Northrup, Richardson, TX (US)

(73) Assignee: Polytronix, Inc., Richardson, TX (US)

( * ) Notice: Subject to any disclaimer, the term of this patent is extended or adjusted under 35 U.S.C. 154(b) by 0 days.

(21) Appl. No.: 15/073,256

(22) Filed: Mar. 17, 2016

(65) Prior Publication Data

US 2017/0269396 A1    Sep. 21, 2017

(51) Int. Cl.
*G02F 1/1334*    (2006.01)
*G02F 1/1333*    (2006.01)
*G02F 1/1335*    (2006.01)

(52) U.S. Cl.
CPC .......... *G02F 1/1334* (2013.01); *G02F 1/1333* (2013.01); *G02F 1/133553* (2013.01); *G02F 2001/133374* (2013.01); *G02F 2202/36* (2013.01)

(58) Field of Classification Search
CPC ... C09K 19/544; G02F 1/1303; G02F 1/1334; G02F 1/137; G02F 1/1333; G02F 1/133553; G02F 1/133374; G02F 2202/36
See application file for complete search history.

(56) References Cited

U.S. PATENT DOCUMENTS

| 6,215,535 | B1 | 4/2001 | Nakajima et al. |
| 6,221,443 | B1 | 4/2001 | Kubota et al. |
| 6,331,881 | B1 | 12/2001 | Hatano et al. |
| 6,864,951 | B1 | 3/2005 | Ren et al. |

(Continued)

OTHER PUBLICATIONS

Anna E. Fox and Adam K. Fontecchio, Liquid crystal polymer composite films for reconfigurable photomasking applications, Applied Physics Letters, 2007, vol. 91, Issue 14, pp. 141119-14119-3.

(Continued)

*Primary Examiner* — Sophie Hon
(74) *Attorney, Agent, or Firm* — Scott T. Griggs; Griggs Bergen LLP

(57) ABSTRACT

A polymeric dispersed liquid crystal light shutter device and system and method for forming the same are disclosed. In one embodiment of the system, a catoptric form having a shape is subjacently positioned below a pre-cure or un-cured polymer dispersed liquid crystal (PDLC) light shutter device having liquid crystals dispersed in a polymer binder system between two substrates. Light is applied during curing. The liquid crystal microdroplet sizes vary according to the shape of the catoptric form such that domains of smaller liquid crystal microdroplet sizes correspond to the shape and domains of larger liquid crystal microdroplet sizes correspond to negative space relative to the shape. Upon tuning an electric field, the PDLC light shutter device changes states from presenting a surface having an image formed by non-scattering regions contrasted against opaque scattering regions, to a surface characterized by mostly or entirely clear, non-scattering light transmittance.

12 Claims, 3 Drawing Sheets

(56) References Cited

U.S. PATENT DOCUMENTS

| | | |
|---|---|---|
| 7,042,549 B1 | 5/2006 | Ren et al. |
| 7,724,347 B2 | 5/2010 | Tseng et al. |
| 8,028,473 B2 | 10/2011 | Galstian et al. |
| 8,033,054 B2 | 10/2011 | Galstian et al. |
| 8,072,574 B2 | 12/2011 | Galstian et al. |
| 8,100,539 B2 | 1/2012 | Tseng et al. |
| 8,411,193 B2 | 4/2013 | Chin |
| 8,570,461 B2 | 10/2013 | Lee et al. |
| 2006/0187402 A1 | 8/2006 | West et al. |
| 2008/0252556 A1 | 10/2008 | Tseng et al. |
| 2010/0271571 A1* | 10/2010 | Zhang .................... C09K 19/44 349/86 |
| 2015/0123031 A1* | 5/2015 | Chen .................... C09K 19/544 252/299.6 |

OTHER PUBLICATIONS

Hongwen Ren, Yun-Hsing Fan, and Shin-Tson Wu, Prism grating using polymer stabilized nematic liquid crystal, Applied Physics Letters, 2003, vol. 82, No. 19, pp. 3168-3170.

\* cited by examiner

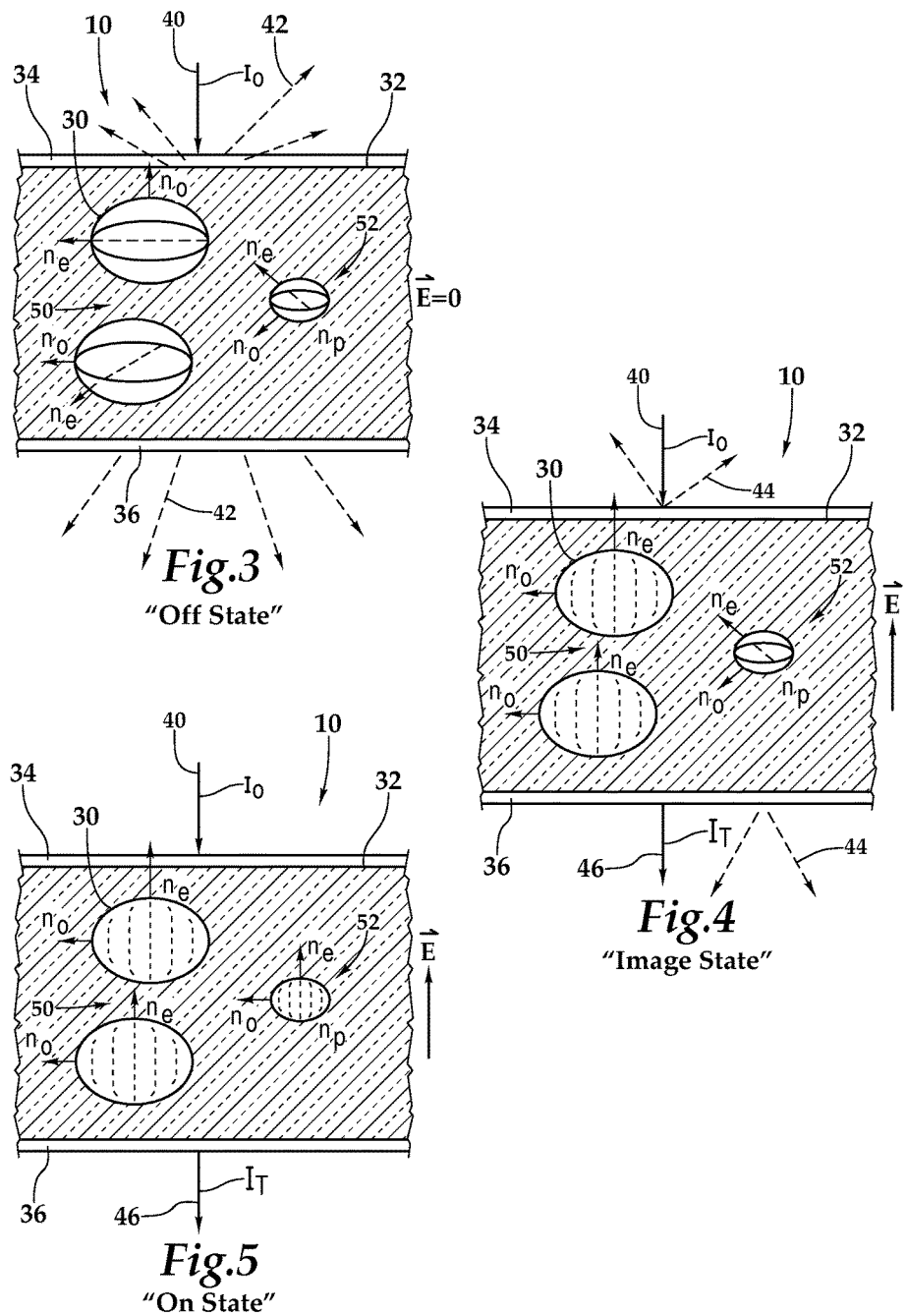
Fig.3 "Off State"
Fig.4 "Image State"
Fig.5 "On State"

POLYMERIC DISPERSED LIQUID CRYSTAL LIGHT SHUTTER DEVICE AND SYSTEM AND METHOD FOR FORMING THE SAME

TECHNICAL FIELD OF THE INVENTION

This invention relates, in general, to liquid crystal display technology and, in particular, to polymer dispersed liquid crystal (PDLC) light shutter devices that include formulations of liquid crystal mixtures having nematic liquid crystals and polymer systems to provide visual effects.

BACKGROUND OF THE INVENTION

A liquid crystal display can show an image using electro-optical characteristics of a liquid crystal, which is injected into a space defined by two substrates. The electro-optical characteristics of the liquid crystals appear when electric power is applied thereto. Such a liquid crystal display is classified as one of a variety of types including twisted nematic (TN), super twisted nematic (STN), dynamic scattering mode (DSM), and the aforementioned PDLC, for example. Liquid crystal shutters are useful in various applications concerning the transmittance of light through an aperture in which it should be possible to switch the shutter between a low transmission state and a high transmission state, in response to a change in the electric influence.

PDLCs consist of micron-size droplets of low-molecular weight nematic liquid crystals dispersed in a polymer binder system. A PDLC material is sandwiched between substrates having a transparent conducting electrode such as indium tin oxide, to form a shutter. Upon application of a voltage across the electrodes of the shutter, a switching occurs from an opaque, high scattering state to a clear, transparent state. PDLC materials are formed by phase separation of low-molecular weight liquid crystals from a homogeneous solution with pre-polymer or polymer. The size, shape, and density of the liquid crystal droplets depend on the techniques implemented. With existing shutters, solutions have been proposed over the years for selectively providing a tunable lens. Many of the existing devices, however, require the liquid crystal material be aligned on convex curved substrates or concave curved substrates, where it is extremely difficult to align the liquid crystal molecules on the curved substrates. Additionally, most of these devices require linearly polarized light sources in order to operate. Accordingly improvements are needed.

SUMMARY OF THE INVENTION

It would be advantageous to provide a tunable lens in a PDLC system. It would also be desirable to enable a chemical-based solution that would mitigate the need for convex or concave substrates and the request for linearly polarized light. To better address one or more of these concerns, a polymeric dispersed liquid crystal light shutter device employing an electronically tunable image is disclosed. In one embodiment of the system, a catoptric form having a shape is subjacently positioned below a pre-cure or un-cured PDLC light shutter device having liquid crystals dispersed in a polymer binder system between two substrates. Light is applied during curing. The liquid crystal microdroplet sizes vary according to a shape of a catoptric form such that domains of smaller liquid crystal microdroplet sizes correspond to the shape of the catoptric form and domains of larger liquid crystal microdroplet sizes correspond to negative space relative to the shape.

Upon tuning an electric field, the PDLC light shutter device changes states from presenting a surface having an image formed by non-scattering regions contrasted against opaque scattering regions, to a surface characterized by mostly or entirely clear, non-scattering light transmittance. A corresponding PDLC light shutter device and method for forming the same are additionally disclosed. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 3 is a diagrammatic view of one embodiment of the liquid crystal shutter depicted in FIG. 1 in a high scattering opaque state;

FIG. 4 is a diagrammatic view of one embodiment of the liquid crystal shutter depicted in FIG. 1 in a translucent, image state;

FIG. 5 is a diagrammatic view of one embodiment of the liquid crystal shutter depicted in FIG. 1 in a low scattering transparent state.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
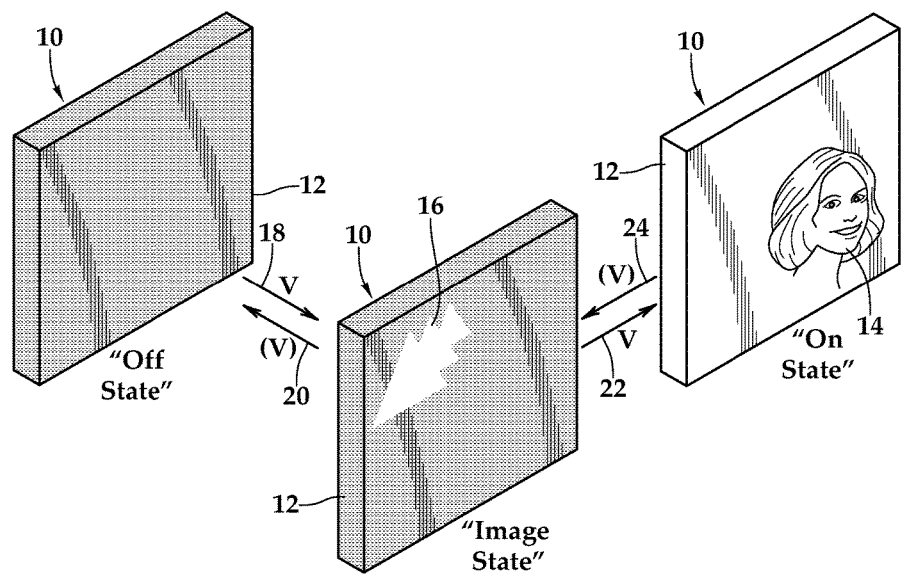
FIG. 1 is a diagrammatic view of one embodiment of a liquid crystal shutter being utilized to provide each of an opaque, high scattering state; a translucent, image state; and a clear, transparent state.

Referring initially to FIG. 1, therein is depicted a PDLC light shutter device or, more succinctly, a liquid crystal shutter that is schematically illustrated and generally designated 10. Liquid crystals are substances that exhibit a phase of matter that has properties between those of a conventional liquid, and those of a solid crystal. For instance, a liquid crystal may flow like a liquid, but have the molecules in the liquid arranged and/or oriented in a crystal-like way. One type of liquid crystal, in the aforementioned polymer dispersed liquid crystal or PDLC, comprises micro-size droplets of low-molecular weight nematic liquid crystals dispersed in a polymer binder system. The liquid crystal shutter 10 includes a PDLC material interposed between substrates having transparent conducting electrodes. In FIG. 1, the liquid crystal shutter 10 is being utilized as a window 12, behind which, an individual 14 is standing. Moreover, as shown, the liquid crystal shutter 10, in response to electronic tuning, includes an image 16, which may be a logo, a graphic mark, an emblem, a symbol, or words, for example.

Upon application of a voltage across the electrodes of the liquid crystal shutter 10, as shown by arrow 18, the liquid crystal shutter 10, switches from an opaque, high scattering state, labeled as an "OFF State" to a translucent, image state, labeled "IMAGE State," wherein the image 16 is visible. Upon removal of the voltage (V), as shown by arrow 20, the liquid crystal shutter 10 switches from the translucent, image state to the opaque, high scattering state. Continuing with the discussion of the "IMAGE State," upon the application of a further voltage across the electrodes of the liquid crystal shutter 10, as shown by arrow 22, the liquid crystal shutter 10 switches from the translucent, image state to a clear, transparent state, labeled as the "ON State," wherein the individual 14 can be seen standing behind the window 12. As shown by arrow 24, by the reduction in voltage, the "ON State" returns to the "IMAGE State." It should be appreciated that although the liquid crystal shutter is presented as a window, the teachings presented herein extend to any type of aperture including apertures for looking through, apertures having a need for clear and opaque states, switchable glass, privacy glass, smart windows, smart glasses. Further the light crystal shutter may be glass, plexiglass, polycarbonate or other material as will be discussed hereinbelow.

Figure 2:
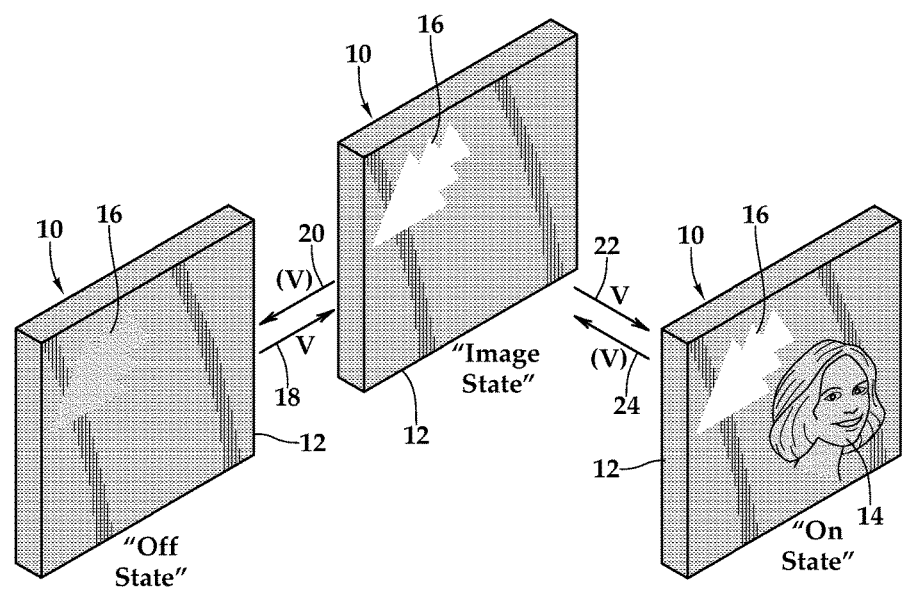
FIG. 2 is a diagrammatic view of another embodiment of a liquid crystal shutter being utilized to provide each of an opaque, high scattering state; a translucent, image state; and a clear, transparent state.

FIG. 2 is a diagrammatic view of another embodiment of a liquid crystal shutter 10 being utilized to provide each of an opaque, high scattering state, a translucent, image state, and a clear, transparent state. As shown, by electronically tuning the PDLC shutter device with the application and reduction of voltage as shown by arrows 18, 20, 22, and 24, the PDLC shutter device is selectively tunable among the "OFF State," "IMAGE State," and "ON State." Depending on the curing parameters, in one embodiment, the image 16 may be partially visible in either the "OFF State," the "ON State," or both. Or alternatively, by way of example, the image 16 may be partially visible in the "OFF State," the "IMAGE State", and the "ON State." Further still, depending on the curing parameters, in one implementation, the "OFF State," the "IMAGE State", and the "ON State" may have varying degrees of opacity.

As previously mentioned, liquid crystal lens have been proposed over the years for selectively controlling the index of refraction of light passing through the lens such that a gradient-index liquid crystal lens with a tunable focal length is provided. In one embodiment of the liquid crystal shutter 10, a flat profile is provided such that an alignment on convex curved substrates or concave curved substrates is not necessary. Further, a linearly polarized light source is not necessary in order to operate and, for example, view the individual 14. In one implementation, the polymer binder system may include light curable adhesives selected from the group consisting of acrylates, methacrylates, thiolene-based polyurethanes, and mercapto-esters with a photoinitiator.

FIG. 3 depicts one embodiment of the liquid crystal shutter 10 wherein encapsulated liquid crystal microdroplets 30 are distributed uniformly in a polymer binder system 32, which may have the form of a plastic matrix, to create the PDLC material that is then sandwiched between two transparent substrates 34, 36. In one implementation, the substrates 34, 36 are positioned parallel or substantially parallel to each other and include a transparent body having a transparent conducing layer therewith. The transparent body may be selected from materials consisting of glasses and plastics, for example. Moreover, the transparent body may include a refractive index from about 1.51 to about 1.52. The polymer binder system 32 may also have a refractive index from about 1.51 to about 1.52. It should be appreciated that the refractive indexes of the transparent substitutes 34, 36 and the polymer binder system 32 are matched as close as possible to improve transparency. The transparent conducting layer may comprise an indium-tin-oxide conducting layer or other suitable conducting layer, for example.

Figure 6:
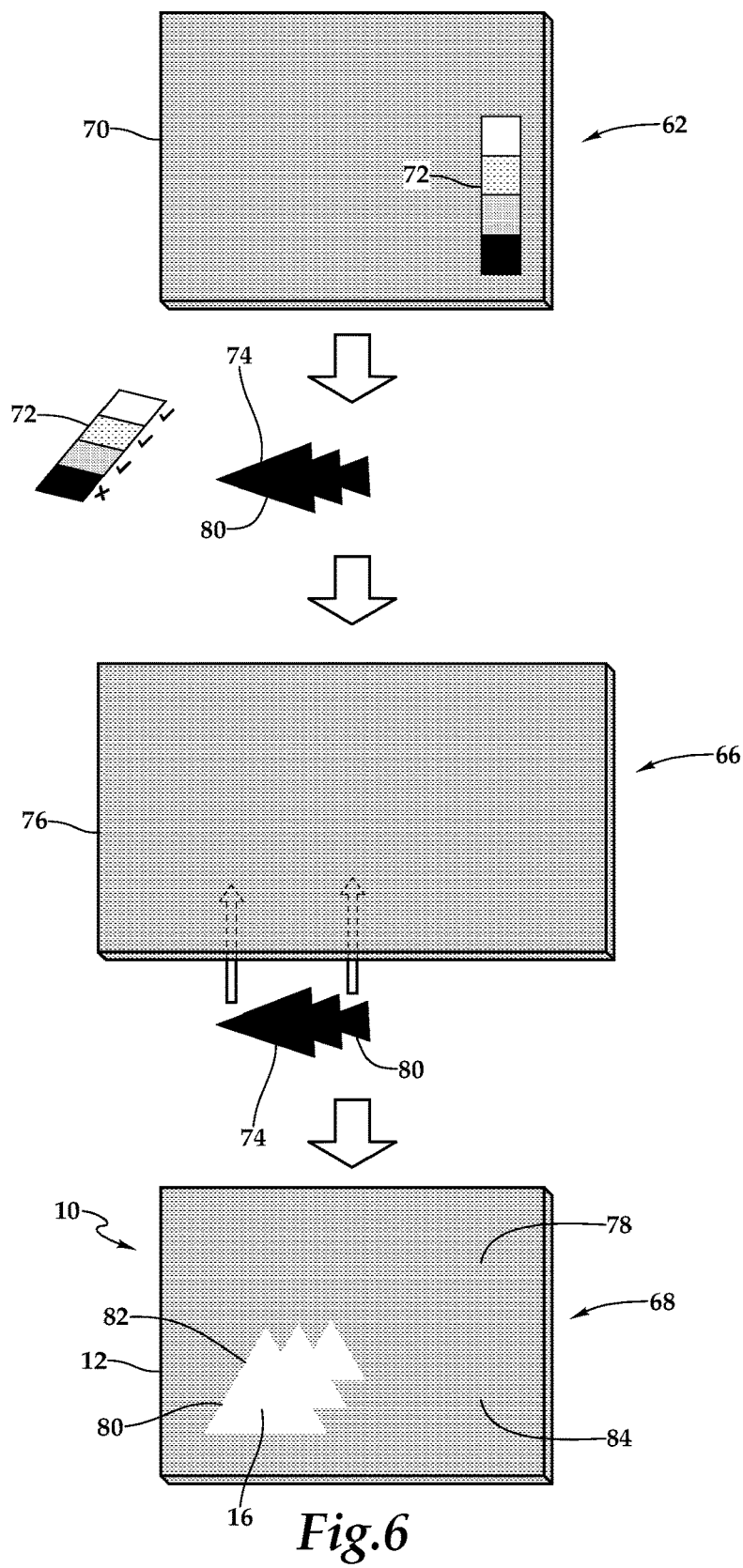
FIG. 6 is a diagrammatic view of one embodiment of a methodology and process for forming polymeric dispersed liquid crystal light shutter device according to the teachings presented herein.

As illustrated, the liquid crystal shutter 10 includes inhomogeneous droplet size distributions of the liquid crystal microdroplets 30 in the polymer binder system 32, which as will be discussed in FIG. 6, are formed by exposing UV light to the LC/monomer mixture using a catoptric form, for example. The inhomogeneous droplet size distribution includes a large domain 50 and a small domain 52. In the brighter region corresponding to presence of the catoptric form, the polymerization rate is faster resulting in smaller liquid crystal microdroplets 30 at the small domain 52. In the weaker UV exposure regions corresponding to the absence of the catoptric form, the liquid crystal microdroplets 30 are larger at the large domain 50. It should be appreciated that the gradient of liquid crystal microdroplet sizes can vary from approximately a few nanometers to micrometers, depending on formation characteristics.

FIG. 3, which is an "OFF State" shows a light scattering state of the liquid crystal microdroplets 30 in the polymer binder system 32, in the absence of an applied electric field. Within each of the liquid crystal microdroplets 30, liquid crystals have tangential wall alignment; however, there is a two dimension random orientation of molecules in comparing various liquid crystal microdroplets 30. In terms of optical properties, this corresponds to a highly light scattering state.

That is, in the absence of an applied electric field ($\vec{E}=0$), the optic axes of the liquid crystal microdroplets 30 have no preferred direction in which to point in the plane, so that incident light encounters a mismatch between the refraction index ($n_p$) of the matrix and the effective refraction index ($\sim n_{eff}$) of the liquid crystal microdroplets. The result of the mismatch is that the light is scattered and the liquid crystal shutter 10 appears opaque. On the other hand, if an electrical field ($\vec{E}$) is applied as shown in FIG. 3 and FIG. 4, the orientations of molecules among various microdroplets is completely aligned. The applied electric field ($\vec{E}$) aligns the directors within the droplets to a partial or completely transparent state such that $n_{eff} \rightarrow n_o = n_p$ when $\rightarrow$ is $\vec{E}$ at high field.

With reference to the light scattering state of FIG. 3, the optic axis of the droplets is indicated by $n_e$. If the ordinary refractive index of the liquid crystal, $n_o$, matches that of the polymer binder system 32, $n_p$, then light scatters according to the value and orientation distribution of $n_e$. In a low field, if $n_{eff}$ is close to $n_e$ and nematic directors are randomly oriented (OFF state), light is strongly scattered. If $n_e$ is reoriented to be parallel to the direction of normally incident light, as in the case under an applied electric field, then, in principle, no light is scattered ($n_o \sim n_p$). It should be appreciated that the liquid crystal microdroplets may be fabricated as spherical or elliptical shapes and that the shape of the liquid crystal microdroplets may change shape and size due to other factors when the liquid crystal shutter 10 is assembled, as the liquid crystal microdroplets are compressed in combination before curing has begun.

By way of illustration, the "effective" refractive index, which may be the "average," approaches the "extraordinary"

at a maximum. By way of example, if "ordinary" or no is 1.52, the polymer or $n_p$ is 1.52, and the "extraordinary" or $n_e$ is 1.56, the "effective" or $n_{eff}$ is 1.52 i.e. equals the ordinary in a strong electric field, but can move to 1.56 as incident light encounters the $n_e$ in the OFF or no-electric field scattering state.

As mentioned, in FIG. 4, in response to an application of an electric field ($\vec{E}=\uparrow$) across the transparent substrates 34, 36, the liquid crystal shutter 10 provides for the partial transmission of light to cause an "IMAGE State". The electric field causes the optic axes of the liquid crystal microdroplets 30 in the large domain 50 to align parallel to the field and normal to the surfaces of the transparent substrates 34, 36. The optic axes of the liquid crystal microdroplets 30 in the small domain 52, on the other hand, have no preferred direction in which to point in the plane, so that incident light encounters a mismatch between the refraction index $n_p$ of the matrix and the average refraction index ($\sim n_e$) of the liquid crystal microdroplets. The result of the mismatch is that the light is scattered and, with respect to the small domain 52, the liquid crystal shutter 10 appears opaque.

In this transmission state, which may be an "ON STATE," incident light 40 detects no mismatch between average refractive index of the liquid crystal droplets ($\sim n_o$) with respect to the large domain and the polymer binder system 32 ($n_p$) and light is transmitted so that the image 16 within the liquid crystal shutter 10 appears clear.

As mentioned, in FIG. 5, in response to an application of an electric field ($\vec{E}=\uparrow$) across the transparent substrates 34, 36, the liquid crystal shutter 10 provides transmission of light. The electric field causes the optic axes of the liquid crystal microdroplets 30 in both the large domain 50 and the small domain 52 to align parallel to the field and normal to the surfaces of the transparent substrates 34, 36. In this transmission state, incident light 40 detects no mismatch between average refractive index of the liquid crystal droplet ($\sim n_o$) and the polymer binder system 32 ($n_p$) and light 46 is transmitted so that the liquid crystal shutter 10 appears clear. As mentioned, by the application and removal of the driving voltage the liquid crystal shutter 10 may be alternated between the light scattering state of FIG. 3, the partial scattering of FIG. 4 and the light transmission state of FIG. 5.

With reference to FIGS. 3 through 5, in the voltage OFF state of FIG. 3, the liquid crystal shutter 10 is non-transparent and light scattering is observed as oriented directions of the liquid crystal microdroplets 30 are random. This is because the droplet sizes are much smaller than the wavelength. As the voltage is applied to the liquid crystal shutter 10 as shown in FIG. 4 and FIG. 5, the liquid crystal microdroplets are reoriented along the electric field direction. The turn ON voltage of such liquid crystal microdroplets 30 depends on the droplet sizes: the smaller the droplet, the higher the threshold voltage. As a result, the gradient refractive index profile is generated that initially permits incident light 40 to be partially scattered as scattered light 44 by the small domains 52 and transmitted by the large domains 50, giving rise to transmitted light 46 and the appearance of the image 16. In one embodiment, as the voltage increases, all of the domains, including the large domain 50 and the small domain 52, are aligned such that incident light 40 is transmitted as transmitted light 46.

With respect to the driving voltage characteristics of FIGS. 4 and 5, a lower voltage for image distinction/ visualization, for example, from about 14 V to about 50 V AC range, may be utilized in FIG. 4. For full transmission or a clear, plain window, ON at higher ranges in FIG. 5, for example, may be from about 65 V to about 110 V AC. Voltage correlates to liquid crystal domain size. The catoptric form includes reflective shapes, including patterns, that are objects like a mold that give shape to a formless subject to create the image 16. Depending on the reflectivity of the catoptric form, the liquid crystal domain size adjacent to the catoptric form will vary with the liquid crystal domain size being smaller with the increased reflectivity of the catoptric form. In one implementation, the catoptric form includes a UV-reflective material and in one particular implementation, the catoptric form may be aluminum foil.

FIG. 6 depicts one embodiment of a methodology and process for forming a PDLC light shutter device employing an electronically tunable lens. In the illustrated embodiment, a catoptric form comprising a shape of aluminum foil is utilized. More specifically, at step 62, a test run is conducted wherein a PDLC regular cure substrate 70 and a reflection gradient 72 are subjected to a UV light treatment. In one embodiment, the reflection gradient 72 may be a gradient with set, increasing levels of reflectivity, for example, that help determine correct reflectivity of a catoptric form 74. By way of example and not by way of limitation, this may be a strip of aluminum with a greyscale—increasing darkness-gradient imprinted thereon or a metal-based gradient. At step 64, the catoptric form 74 having a shape 80 is provided. The exposure gradient 72 allows for the selection of appropriate exposure or exposures. At step 66, a pre-cure or un-cured light shutter device 76 having a flat profile is provided, which may include two substrates disposed substantially parallel and a polymer binder system interposed between the substrates with a plurality of liquid crystals dispersed in the polymer binder system.

Continuing with the description of step 66, the catoptric form is placed in selectively temporarily close contact with the second substrate of the pre-cure or un-cured light shutter device 76 such that the catoptric form 76 is subjacent to the second substrate. Then, light is applied in the range of about 300 nm to about 700 nm to cure the liquid crystal microdroplet sizes. In one embodiment, a narrower range of UV-light may be applied. The liquid crystals include inhomogeneous liquid crystal microdroplet sizes corresponding to the shape 80 of the catoptric form 74. More particularly, the liquid crystal microdroplet sizes vary according to the shape of the catoptric form such that domains of smaller liquid crystal microdroplet sizes correspond to the shape 80 and another domain of larger liquid crystal microdroplet sizes correspond to negative space relative to the shape.

At step 68, the catoptric form 16 is removed from the substrate and the light shutter device 78 is cured, thereby providing the liquid crystal light shutter device 12 having a flat profile. The image 16 is a sufficiently cured region 82, corresponding to the shape 80, while the negative space relative to the image is a fully cured region 78, corresponding to the negative space 84 relative to the shape 80. It should be appreciated that with the catoptric form-technology presented herein smaller, faster-cured liquid crystal domains versus larger, slower-cured liquid crystal domains are present as the catoptric form reflects UV-light to create faster-cured, smaller domain regions. Once formed, the light shutter device 12 provides, in absence of an application of an electric field across the substrates, optic axes of the liquid crystal microdroplets of the larger and smaller domains with no preferred direction and light is scattered, whereby the liquid crystal shutter 10 appears opaque.

The light shutter device 12 provides, in response to an application of a first electric field across the first and second substrates, the optic axes of the liquid crystal microdroplets of the various or first domains have an aligned direction and light is transmitted therethrough, the optic axes of the liquid crystal microdroplets of the second domains have no preferred direction and light is scattered, whereby the liquid crystal shutter 10 appears opaque with an image thereon. The light shutter device also provides, in response to an application of a second electric field across the first and second substrates, the optic axes of the liquid crystal microdroplets of the first and second domains have an aligned direction and light is transmitted therethrough, whereby the liquid crystal shutter 10 appears transparent.

The order of execution or performance of the methods and process flows illustrated and described herein is not essential, unless otherwise specified. That is, elements of the methods and process flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for forming a polymer dispersed liquid crystal light shutter device, the system comprising:
   a catoptric form having a shape;
   first and second substrates disposed substantially parallel;
   a polymer binder system interposed between the first and second substrates;
   a plurality of liquid crystals dispersed in the polymer binder system,
   whereby selectively temporarily close contact of the catoptric form with the second substrate and application of light in the range of about 300 nm to 700 nm cured the liquid crystal microdroplet sizes such that the plurality of liquid crystals include inhomogeneous liquid crystal microdroplet sizes corresponding to the catoptric form having a shape, the liquid crystal microdroplet sizes varying according to the shape of the catoptric form such that first domains of smaller liquid crystal microdroplet sizes correspond to the shape, and second domains of larger liquid crystal microdroplet sizes correspond to negative space relative to the shape, the catoptric form being subjacent to the second substrate such that the catoptric form reflects light from a light source toward the second substrate;
   in absence of an application of an electric field across the first and second substrates, optic axes of the liquid crystal microdroplets of the first and second domains have no preferred direction and light is scattered, whereby the liquid crystal shutter appears opaque;
   in response to an application of a first electric field across the first and second substrates, the optic axes of the liquid crystal microdroplets of the first domains have an aligned direction and light is transmitted therethrough, the optic axes of the liquid crystal microdroplets of the second domains have no preferred direction and light is scattered, whereby the liquid crystal shutter appears opaque with an image thereon, the image corresponding to the shape of the catoptric form; and
   in response to an application of a second electric field across the first and second substrates, the optic axes of the liquid crystal microdroplets of the first and second domains have an aligned direction and light is transmitted therethrough, whereby the liquid crystal shutter appears transparent.

2. The system for forming the polymer dispersed liquid crystal light shutter device as recited in claim 1, wherein the first and second substrates each further comprises an indium-tin-oxide conducting layer.

3. The system for forming the polymer dispersed liquid crystal light shutter device as recited in claim 1, wherein the polymer binder system further comprises a plurality of light curable adhesives selected from the group consisting of acrylates, methacrylates, thiolene-based polyurethanes, and mercapto-esters with a photoinitiator.

4. The system for forming the polymer dispersed liquid crystal light shutter device as recited in claim 1, wherein the first electric field is driven by a voltage of about 14 V to about 50 V.

5. The system for forming the polymer dispersed liquid crystal light shutter device as recited in claim 1, wherein the second electric field is driven by a voltage of about 65 V to about 110 V.

6. A system for forming a polymer dispersed liquid crystal light shutter device, the system comprising:
   a catoptric form having a shape;
   first and second substrates disposed substantially parallel;
   a polymer binder system interposed between the first and second substrates;
   a plurality of liquid crystals dispersed in the polymer binder system,
   whereby selectively temporarily close contact of the catoptric form with the second substrate and application of light in the range of about 340 nm to 410 nm cured the liquid crystal microdroplet sizes such that the plurality of liquid crystals include inhomogeneous liquid crystal microdroplet sizes corresponding to the catoptric form having a shape, the crystal microdroplet sizes varying according to the shape of the catoptric form such that first domains of smaller liquid crystal microdroplet sizes correspond to the shape, and second domains of larger liquid crystal microdroplet sizes correspond to negative space relative to the shape, the catoptric form being subjacent to the second substrate such that the catoptric form reflects light from a light source toward the second substrate;
   in absence of an application of an electric field across the first and second substrates, optic axes of the liquid crystal microdroplets of the first and second domains have no preferred direction and light is scattered, whereby the liquid crystal shutter appears opaque;
   in response to an application of a first electric field across the first and second substrates, the optic axes of the liquid crystal microdroplets of the first domains have an aligned direction and light is transmitted therethrough, the optic axes of the liquid crystal microdroplets of the second domains have no preferred direction and light is scattered, whereby the liquid crystal shutter appears opaque with an image thereon, the image corresponding to the shape of the catoptric form; and
   in response to an application of a second electric field across the first and second substrates, the optic axes of the liquid crystal microdroplets of the first and second domains have an aligned direction and light is transmitted therethrough, whereby the liquid crystal shutter appears transparent.

7. The system as recited in claim 6, wherein the first and second substrates each further comprises an indium-tin-oxide conducting layer.

8. The system as recited in claim 6, wherein the polymer binder system further comprises a plurality of light curable adhesives selected from the group consisting of acrylates, methacrylates, thiolene-based polyurethanes, and mercapto-esters with a photoinitiator.

9. The system as recited in claim 6, wherein the first electric field is driven by a voltage of about 14 V to about 50 V.

10. The system as recited in claim 6, wherein the second electric field is driven by a voltage of about 65 V to about 110 V.

11. The system as recited in claim 6, wherein the catoptric form further comprises a UV-reflective material.

12. The system as recited in claim 6, wherein the catoptric form further comprises aluminum foil.

\* \* \* \* \*

UNITED STATES PATENT AND TRADEMARK OFFICE
CERTIFICATE OF CORRECTION

PATENT NO.        : 10,067,370 B2
APPLICATION NO.   : 15/073256
DATED             : September 4, 2018
INVENTOR(S)       : Menting Tim Tsai et al.

Page 1 of 1

It is certified that error appears in the above-identified patent and that said Letters Patent is hereby corrected as shown below:

In the Claims

Column 8, Line 42:
"catoptric form having a shape, the crystal microdroplet"
Should read:
--catoptric form having a shape, the liquid crystal microdroplet--

Signed and Sealed this
Twentieth Day of November, 2018

Andrei Iancu
*Director of the United States Patent and Trademark Office*